Patented July 19, 1932

1,867,960

UNITED STATES PATENT OFFICE

JOHANN KARL WIRTH, OF BERLIN-ALTGLIENICKE, GERMANY

ACID-PROOF STRUCTURE

No Drawing. Application filed June 16, 1927, Serial No. 199,412, and in Germany January 5, 1927.

This invention provides a novel process for the production of acid-proof structures from artificial resins, primarily but not exclusively for use in conjunction with acid-proof slabs, bricks or other similar bodies. A feature of the process is that the medium employed for laying, cementing or jointing such bodies consists of artificial phenolaldehyde compositions which are hardened by the action of acids, even in the cold.

The preferred method of carrying out the process is by mixing the condensation product employed (for example, fluid artificial resin) with a little filling material, and then treating it with such an amount of aqueous or alcoholic hydrochloric acid, other acid, or substances furnishing acid, that the hardening reaction will take place in the cold, without, however, being too violent. Nevertheless, the hardening reaction may occasionally be assisted by moderate heating.

Correct working conditions and proportions of mixing can be easily ascertained by simple tentatory experiment.

Example 1

30 parts of liquid artificial resin and 17 parts of hardened phenolaldehyde artificial resins (powdered scrap) are mixed together and, shortly before use, are mixed, in small quantities, with 6 parts of 15% aqueous hydrochloric acid. The surplus water soon separates out from the emulsified mixture and can be poured off leaving a composition which retains its softness and binding properties for 1-2 hours when spread in a thin layer and in the cold, and by which acid-proof slabs can be firmly cemented on to a foundation and jointed. In about 24 hours, the mass sets hard, is insensitive to most acids and, in contrast to the usual acid cements containing waterglass, is impervious. Its power of resisting heat is not inconsiderable, extending to about 130° C., and sometimes higher. The joints become harder while in use, especially when in contact with boiling hydrochloric acid or the like. Said composition is particularly suitable for cementing slabs consisting of materials that are absorbent, even though only slightly so, because such slabs absorb the water given off during the hardening of the composition.

Example 2

The substances mentioned in Example 1 are mixed with 5 parts of saturated alcoholic hydrochloric acid, instead of with aqueous hydrochloric acid. The reaction proceeds on approximately the same lines as in Example 1, but without any substantial liberation of water. Consequently, the mixture or material obtained in this instance is also suitable for cementing slabs composed of compact or non-absorbent materials. The hardened cement material is itself impervious and non-absorbent.

In addition to the powdered artificial-resin residues, other substances may of course be used (for example, powdered quartz, asbestos, kieselguhr, talc and the like). Calcined gypsum is particularly advisable inasmuch as it renders the liberated water innocuous. On the other hand, gypsum has the defect of causing very rapid hardening and producing a mass less impervious than that of Example 2 and also slightly absorbent.

It must be understood that in carrying out the invention the acid-proof slabs cannot be directly cemented on to iron or the like, since the acid reaction of the cement would corrode the metal parts. The surface of the iron must therefore be coated beforehand with a suitable intermediate layer.

As a development of the process the acid-proof structures concerned (tanks, apparatus, devices, buildings or the like, whether of metal of other materials) may be simply lined with a jointless, homogeneous layer of the described mixture of phenolaldehyde condensation product and acid. Such procedure is possible by reason of the surprisingly small contraction of the artificial-resin mixture in question during the hardening process. Consequently, the lining will adhere satisfactorily even to concave surfaces without any special precautions, provided said surfaces be fairly well roughened.

Care is essential to prevent the material to be lined (for example, iron, cement, concrete, unneutralized waterglass cement, and the like) absorbing acid from the mixture of artificial resin and acid. Owing to loss of acid, the artificial-resin mixture under consideration would be unable to harden on such foundation materials, and for that reason they must be provided with an insulating layer before the artificial-resin mixture is applied. Said insulating layer may consist of any suitable paint, coating material or the like, the customary artificial-resin lacquers and the like being employed with advantage in many instances.

The coatings may be of impervious or also absorbent material, as desired. The best way to apply them is by means of a spatula, followed by light rolling or smoothing. If properly prepared, the mass will have become so hard, even at the end of 24 hours in the cold, that no softening of the mixture need be feared when afterwards heated.

A still further simplification of the process consists in making the acid-proof structures entirely of the described mixtures of artificial resin and acid. This method of procedure is specially suitable for small structures. Such structures may, of course, be suitably reinforced by iron skeletons or the like.

In connection with the described process, it is sometimes necessary to close up or tighten joints or openings, for which purpose the described mixtures of artificial resin and acid are excellently adapted.

Although in the foregoing examples, aqueous, alcoholic or other solutions of the acids or substances furnishing acids, are employed for hardening the artificial-resin composition, it is possible to operate without solvents, substantial advantages being secured in consequence. Thus, above everything, the binding properties of the artificial-resin mixture are so considerably improved as to enable the smoothest and most compact or non-absorbent masonry, and even glass plates, to be firmly cemented. In carrying out this part of the invention, the acid-proof structures are made with the assistance of an artificial, phenolaldehyde resin mixture, the hardening of which is effected by means of an acid salt (such as sodium bisulphate) which may be added in a powdered condition. Solution takes place rapidly, and the hardening of the mass proceeds in practically the same manner as when an aqueous or alcoholic solution is used. The amount of said salt used depends on the composition of the artificial-resin mixture; it must be sufficient to neutralize the alkaline or basic substances present in the artificial resin and, in addition, a certain excess of the salt must be used, the extent of which varies according to circumstances. As a rule, the amount of such excess of acid salt is smaller than the amount required for neutralizing the artificial resin.

Obviously, acid salts will also act when employed in a dissolved state, but in such event the extraordinary binding properties of the material are somewhat impaired.

Fibrous materials, especially of a felted or woven character, may be incorporated into the cold-setting layer of artificial resin, the resin itself being used in such a highly fluid condition that it will thoroughly impregnate the fibres. Such highly fluid condition of the mixture of artificial resin and acid can be attained, for example, by only using small amounts, if any, of solid additions, or by using such solid additions as impart fluidity to the mixture (for instance finely divided graphite). The desired degree of fluidity can likewise be obtained by the addition of a solvent (such as alcohol or the like).

*Example 3*

In order to provide an iron stirring apparatus with a lining capable of resisting hydrochloric acid, it is first given two or three coats of rubber solution in benzine, the coating being cold vulcanized with sulphur chloride solution, if desired. Loosely woven asbestos fabric or the like is then dipped in a mixture composed of 50 parts of liquid artificial resin, 30 parts of powdered graphite and 24 parts of 33% alcoholic sulphuric acid. Those parts of the stirrer which are to be protected are then carefully wrapped in the impregnated fabric, the whole being afterwards coated with a smooth covering layer of the same mixture but without embedded fabric. After 4 hours at air temperature, the coating will be ready for use.

Whereas, in the foregoing, the production of acid-proof structures by the aid of phenolaldehyde artificial resins adapted to be hardened with acids in the cold, has been described, it will now be shown that, in certain cases, not only phenolaldehyde artificial resins can be used, but also uncondensed phenolaldehyde mixtures, the production of the resin and the action of the acid taking place in the same working stage. This method of operating presents considerable advantages in connection with those acid-proof structures that already become impregnated with acid during protracted use, that is to say, in executing repairs or in reconstruction. For work of this kind, the measures specified in the previous examples are less suitable.

*Example 4*

10 parts of cresol and 4 parts of trioxymethylene are mixed with a sufficient amount of finely powdered quartz to form a composition possessing the consistency of lard. Said composition is worked in between the acid-soaked bricks and hardens in a few hours, the acid in the brickwork diffusing into the phenolaldehyde mixture.

I claim:

1. An acid resisting structure comprising acid resisting building elements and a binder securing said elements together, comprising a mixture of phenolaldehyde condensation products and acids, said binder being mixed a short time before use so that a hardening automatically takes place at ordinary temperatures.

2. An acid resisting structure comprising acid resisting building elements and a binder securing said elements together, comprising a mixture of phenolaldehyde condensation products and acid salts, said binder being mixed a short time before use so that a hardening automatically takes place at ordinary temperatures.

3. An acid resisting structure comprising acid resisting building elements and a binder securing said elements together, comprising a mixture of phenolaldehyde condensation products and acid producing compounds, said binder being mixed a short time before use so that a hardening automatically takes place at ordinary temperatures.

In testimony whereof I have signed my name to this specification.

JOHANN KARL WIRTH.